(12) United States Patent
Nebel et al.

(10) Patent No.: US 10,021,833 B1
(45) Date of Patent: Jul. 17, 2018

(54) POWER DISTRIBUTION ARRANGEMENT FOR A STAND-ON MOWER

(71) Applicant: Excel Industries, Inc., Hesston, KS (US)

(72) Inventors: Brian Lee Nebel, Hesston, KS (US); Brian Roy Funk, Lehigh, KS (US)

(73) Assignee: EXCEL INDUSTRIES, INC., Hesston, KS (US)

( * ) Notice: Subject to any disclaimer, the term of this patent is extended or adjusted under 35 U.S.C. 154(b) by 85 days.

(21) Appl. No.: 15/216,117

(22) Filed: Jul. 21, 2016

Related U.S. Application Data (60) Provisional application No. 62/195,050, filed on Jul. 21, 2015.

(51) Int. Cl.
| | | |
|---|---|---|
| *A01D 69/00* | (2006.01) | |
| *A01D 69/08* | (2006.01) | |
| *A01D 34/64* | (2006.01) | |
| *A01D 34/74* | (2006.01) | |
| *A01D 69/03* | (2006.01) | |
| *A01D 101/00* | (2006.01) | |

(52) U.S. Cl.
CPC ............ *A01D 69/08* (2013.01); *A01D 34/64* (2013.01); *A01D 34/74* (2013.01); *A01D 69/03* (2013.01); *A01D 2101/00* (2013.01)

(58) Field of Classification Search
CPC .... A01D 34/6806; A01D 69/03; A01D 69/06; A01D 34/69; A01D 34/76; A01D 69/00; A01D 34/008; A01D 34/64; A01D 34/81; A01D 34/74; A01D 2101/00; B60K 7/0015; B60K 17/14
See application file for complete search history.

(56) References Cited

U.S. PATENT DOCUMENTS

| | | | | |
|---|---|---|---|---|
| 5,127,215 A | * | 7/1992 | Wenzel | A01D 34/6806 180/19.1 |
| 5,797,251 A | * | 8/1998 | Busboom | A01D 34/6812 192/224.1 |
| 5,816,034 A | * | 10/1998 | Peter | B60K 7/0015 56/11.4 |
| 5,832,703 A | * | 11/1998 | Evans | A01D 34/6806 180/53.6 |
| 5,865,020 A | * | 2/1999 | Busboom | A01D 34/74 56/10.8 |
| 6,125,630 A | * | 10/2000 | Abend | A01D 34/69 60/435 |
| 6,155,033 A | * | 12/2000 | Wians | A01D 34/6806 56/11.1 |
| 6,389,786 B1 | | 5/2002 | Bergsten et al. | |
| 6,629,577 B1 | * | 10/2003 | Abend | B60K 17/105 180/305 |

(Continued)

*Primary Examiner* — Arpad Fabian-Kovacs
(74) *Attorney, Agent, or Firm* — Robert O. Blinn (57) ABSTRACT

A mower includes mower frame, an engine and a drive arrangement as well as first and second drive wheels and at least one non-drive wheel. A jackshaft assembly is mounted to the frame and is belt powered by the engine. The jackshaft carries a deck drive pulley. The deck drive pulley is operably connected to the cutting deck by a deck drive belt. The deck drive pulley is spaced away from the cutting deck farther than an engine mounted pulley would be spaced away from the cutting deck. This allows the height of the cutting deck to be adjusted while limiting misalignment of the cutting deck drive belt.

19 Claims, 6 Drawing Sheets

(56) References Cited

U.S. PATENT DOCUMENTS

| | | | | |
|---|---|---|---|---|
| 6,755,264 | B2* | 6/2004 | Hasegawa | B60K 17/105 |
| | | | | 180/6.2 |
| 6,875,114 | B2 | 4/2005 | Barron et al. | |
| 6,926,111 | B1* | 8/2005 | Irikura | A01D 34/64 |
| | | | | 180/234 |
| 6,942,375 | B2 | 9/2005 | Chanassyk | |
| 6,973,783 | B1 | 12/2005 | Hauser et al. | |
| 7,503,161 | B1* | 3/2009 | Mizukawa | A01D 34/71 |
| | | | | 56/14.7 |
| 7,596,934 | B2* | 10/2009 | Waesche | A01D 69/00 |
| | | | | 56/10.7 |
| 7,625,290 | B2 | 12/2009 | Hodjat et al. | |
| 7,654,083 | B2* | 2/2010 | Iida | B60K 17/105 |
| | | | | 60/454 |
| 8,151,927 | B2* | 4/2012 | Sakikawa | B60K 7/0015 |
| | | | | 180/305 |
| 8,567,166 | B2* | 10/2013 | Minoura | A01D 69/06 |
| | | | | 56/11.6 |
| 9,021,776 | B2* | 5/2015 | Zwieg | A01D 34/64 |
| | | | | 56/17.1 |
| 9,155,245 | B2* | 10/2015 | Jordan | A01D 34/81 |
| 2003/0213639 | A1* | 11/2003 | Korthals | B62D 51/04 |
| | | | | 180/336 |
| 2006/0281566 | A1 | 12/2006 | Lee | |
| 2007/0151222 | A1* | 7/2007 | Iida | A01D 69/06 |
| | | | | 56/157 |
| 2008/0034722 | A1* | 2/2008 | Wright | A01D 69/00 |
| | | | | 56/14.7 |
| 2013/0047568 | A1* | 2/2013 | Yamada | A01D 69/10 |
| | | | | 56/14.7 |

* cited by examiner

POWER DISTRIBUTION ARRANGEMENT FOR A STAND-ON MOWER

RELATED APPLICATIONS

This application claims the benefit of U.S. Provisional Patent Application 62/195,050 filed on Jul. 21, 2015, which is incorporated herein by reference.

FIELD OF THE INVENTION

This invention relates to a power distribution arrangement for a lawnmower.

BACKGROUND OF THE INVENTION

The transfer of power between the engine of a lawn mower and the cutting deck of such a mower presents design challenges. It is preferable to mount a cutting deck to the frame of a stand-on mower so that the height of the cutting deck can be adjusted. It is also preferable to mount the engine of such a mower to the frame so that the engine is fixed to the frame. This problem becomes more difficult for stand-on mowers. Typical stand-on mowers also include an operator platform which is also fixed to the frame and preferably located at least partially between the main drive wheels. Additionally, for stand-on mowers, the cutting deck is usually positioned forward of the drive wheels. Because it is useful to be able to adjust the height of the cutting deck, it is also useful to have a relatively long deck drive belt extending between an engine driven pulley and a cutting deck drive pulley. A relatively long span between the engine driven pulley and the deck drive pulley where the deck drive belt is received and released by the cutting deck makes it possible to adjust the height of the cutting deck (thereby changing the cutting deck's vertical position with respect to the engine) while still limiting the misalignment of the engine driven pulley and the cutting deck drive pulley to an acceptable degree. However, the forward placement of the engine decreases the distance between the main drive pulley and the cutting deck drive pulley. The relatively close proximity between the main drive pulley of the engine and the cutting deck drive pulley (or pulleys) decreases the ability to adjust the height of the cutting deck while maintaining sufficient alignment between the engine driven pulley and the cutting deck drive pulley. Accordingly, in some stand-on mowers it is necessary to have the engine and various drive system components move with the cutting deck in order to be able to adjust height of the cutting deck without causing an unacceptable misalignment of the deck drive belt. Accordingly, what is needed is a drive arrangement which allows for adjustment of the height of the cutting deck without having to also adjust the height of the engine and other drive system components.

SUMMARY

The above stated need is addressed by a mower having a mower frame, a height adjustable cutting deck, an engine and a drive arrangement which includes a jackshaft power column. The mower frame is supported by first and second drive wheels and at least one non-drive wheel. The engine powers a main drive pulley. The cutting deck is adjustably mounted to the mower frame for height adjustment. The cutting deck has at least one blade drive pulley which receives power via a cutting deck drive belt. The jackshaft power column includes a jackshaft assembly which includes a jackshaft. The jackshaft power column further includes a first pump for supplying hydraulic fluid for powering the first drive wheel, a jackshaft drive pulley and a cutting deck drive pulley. The jackshaft is rotatably mounted to the mower frame. In this one embodiment, the jackshaft drive pulley is fixed to the jackshaft and receives power from the main drive pulley of the engine via a main drive belt. In this one embodiment, the main drive belt also powers a second hydraulic pump which supplies hydraulic fluid to a hydraulic motor that powers the second drive wheel. The cutting deck drive pulley is operably connected by a cutting deck drive belt to the at least one blade drive pulley of the cutting deck. The cutting deck drive belt is received and released by the cutting deck drive pulley of the jackshaft assembly at a jackshaft belt transfer zone. The cutting deck drive belt is received by an idler pulley of the cutting deck and is released by a blade drive pulley of the cutting deck at a cutting deck belt transfer zone. In this embodiment, the distance between the jackshaft belt transfer zone and the cutting deck belt transfer zone is greater than the distance between the main drive pulley which is mounted to the engine and the cutting deck belt transfer zone. The jackshaft is also arranged to directly drive the first hydraulic pump. The jackshaft and the cutting deck are located so that there is sufficient separation between the jackshaft belt transfer zone and the cutting deck belt transfer zone so that height adjustment of the cutting deck does not cause unacceptable misalignment of the cutting deck drive belt.

In one embodiment, the jackshaft rotates on an upright axis. Although the power transfers described above employs pulleys or pulleys and belts, other equivalents such as gears and shafts or chains and sprockets may also be selected. In yet another embodiment, a flexible coupler is interposed between the jackshaft and the first hydraulic pump. In still yet another embodiment, the cutting deck drive pulley is clutched to the jackshaft for selective powering of the cutting deck. And still other embodiments may include any combination of the above described elements.

DETAILED DESCRIPTION

Figure 1:
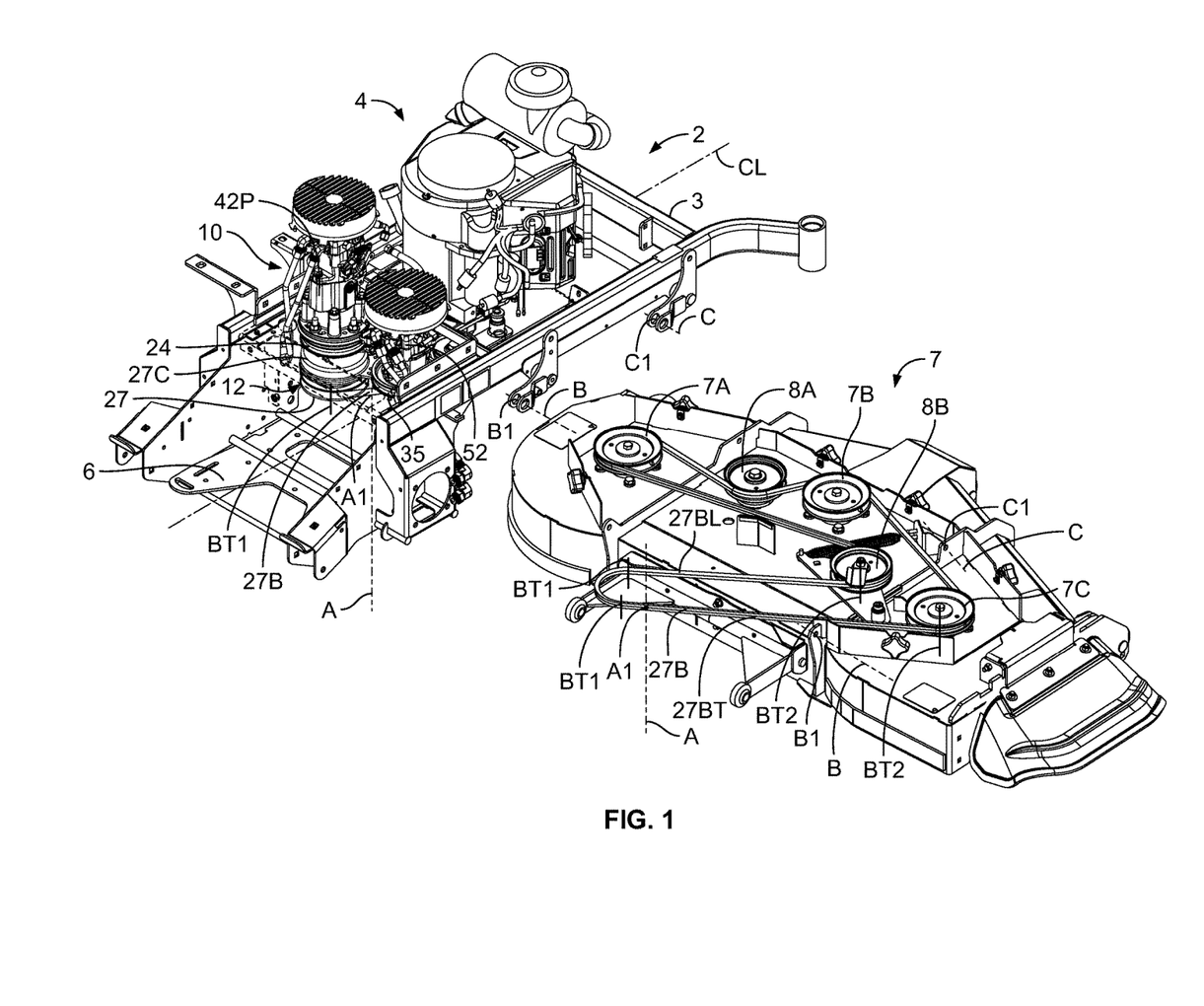
FIG. 1 is a first rear perspective view showing a stand-on mower including one embodiment of the power distribution arrangement with the cutting deck exploded away to one side for clarity.
Figure 2:
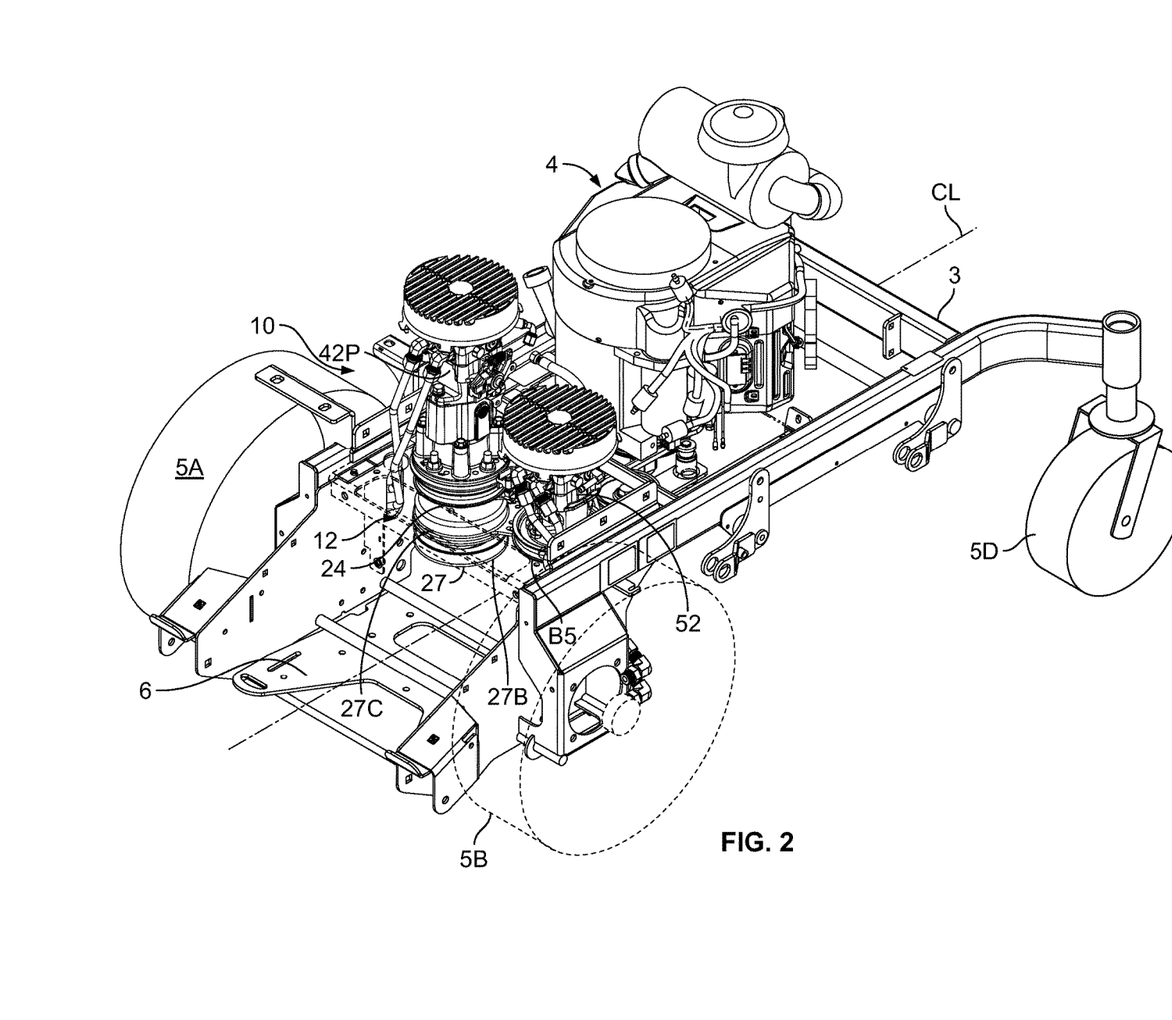
FIG. 2 is a second rear perspective view showing the stand-on mower including one embodiment of the power distribution arrangement with the cutting deck removed for clarity.
Figure 3:
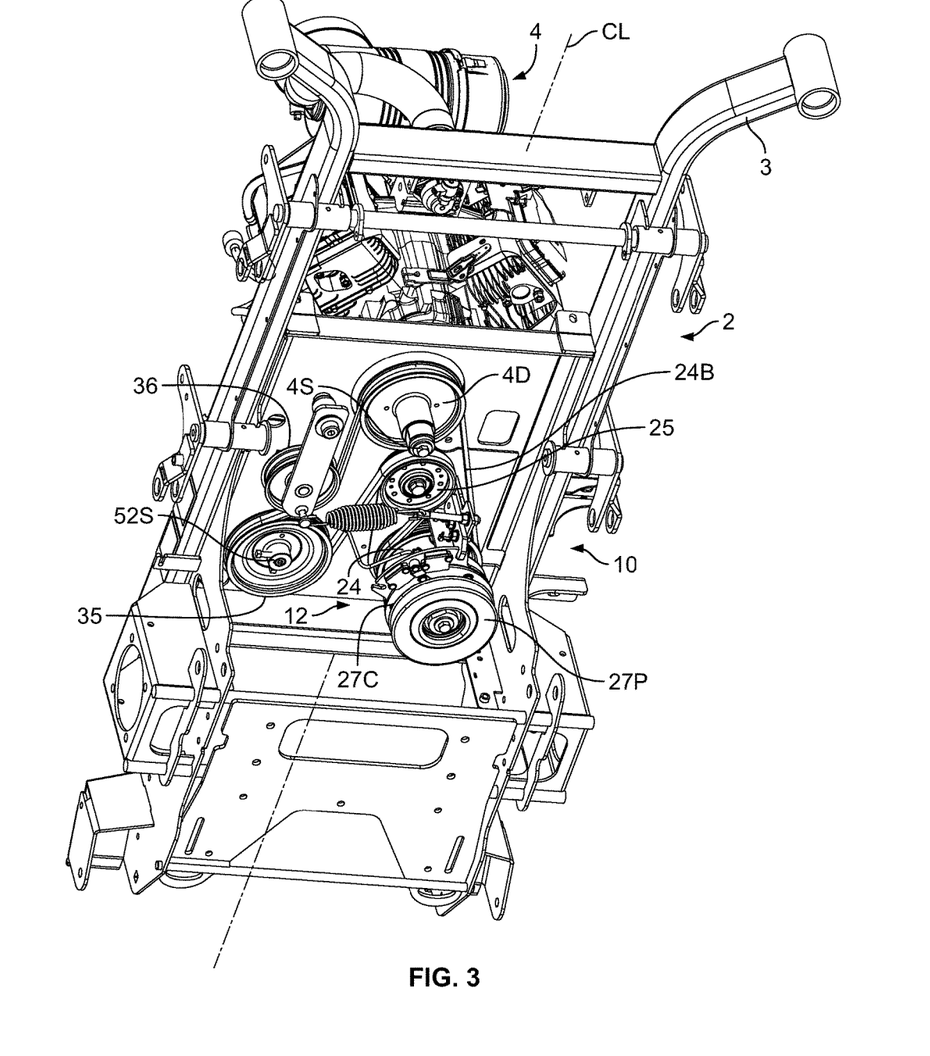
FIG. 3 is a perspective view from the underside of the stand-on mower including one embodiment of the power distribution arrangement with the cutting deck removed for clarity.

Referring to the drawings, FIGS. 1-3 show one embodiment of a power distribution arrangement 10 which is incorporated into a stand-on mower 2. As can be better seen in FIGS. 1 and 2, stand-on mower 2 includes a frame 3, an engine 4 a pair of drive wheels 5A and 5B, a pair of non-driven wheels 5C and 5D (5C not shown in FIG. 1) an operator stand-on platform 6 and a cutting deck 7. In this example, engine 4, drive wheels 5A and 5B and stand-on platform 6 are mounted to frame 3. In this example, cutting deck 7 is located forward of operator platform 6 and is mounted to frame 3 in a manner which permits height adjustment as is well known in the art. In this example, operator stand-on platform 6 is located at least partially between drive wheels 5A and 5B. Also, in this example, engine 4 is located forward of operator stand-on platform 6. Pulley 4D is oriented to turn around an upright axis which is centered on drive shaft 4S. A longitudinal center-line CL for mower 2 is also shown in FIGS. 1, 2 and 3.

As can be seen in FIGS. 1-4, power distribution arrangement 10 includes a jackshaft power column 12 and power distribution pulleys and belts which will be described in greater detail below. In this description the general term "pulley" will be used to refer to drive pulleys, idler pulleys and even what those skilled in the art refer to as a "sheave". Moreover, various "belts" are referred to in this description. The skilled reader should understand that an equivalent of power transfer arrangement including a combination of pulleys and belts might, for example, include sprockets and chains or other similar components.

Figure 4:
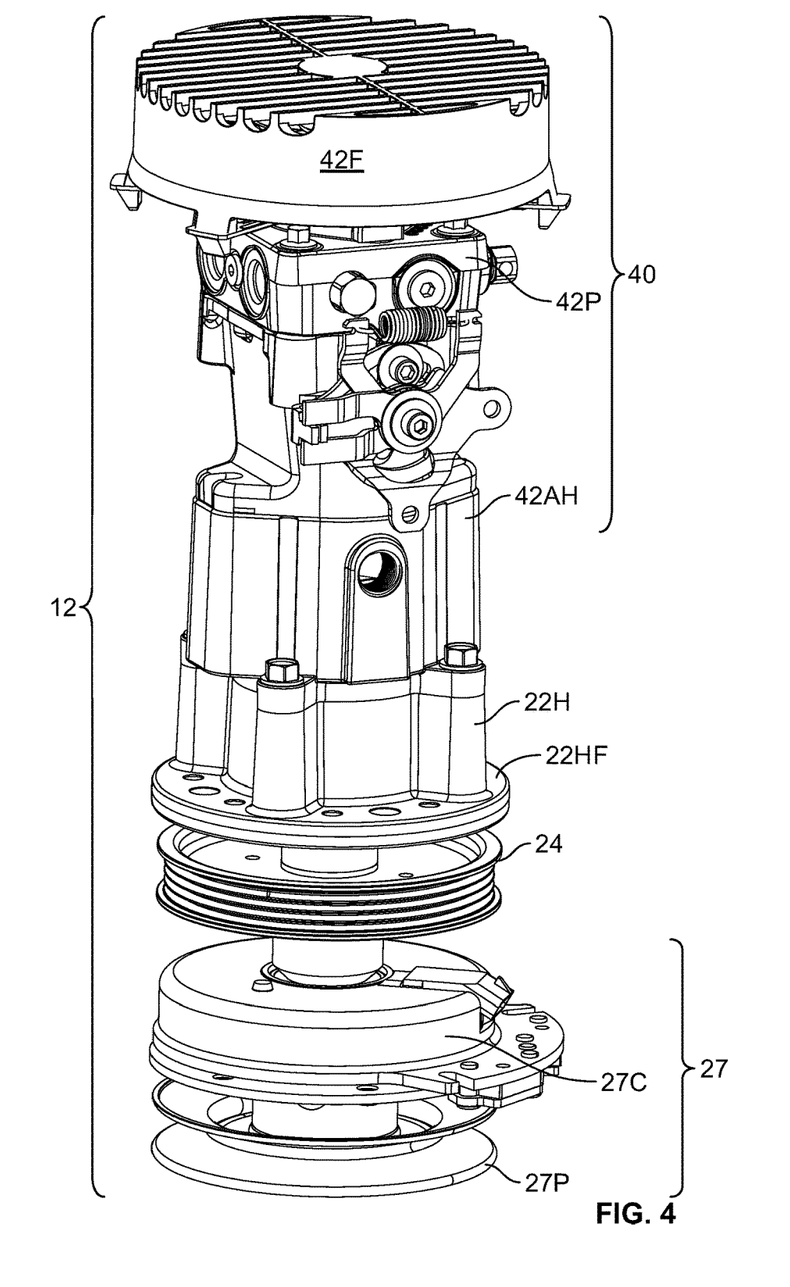
FIG. 4 is a perspective view of one embodiment of the jackshaft power column.
Figure 5:
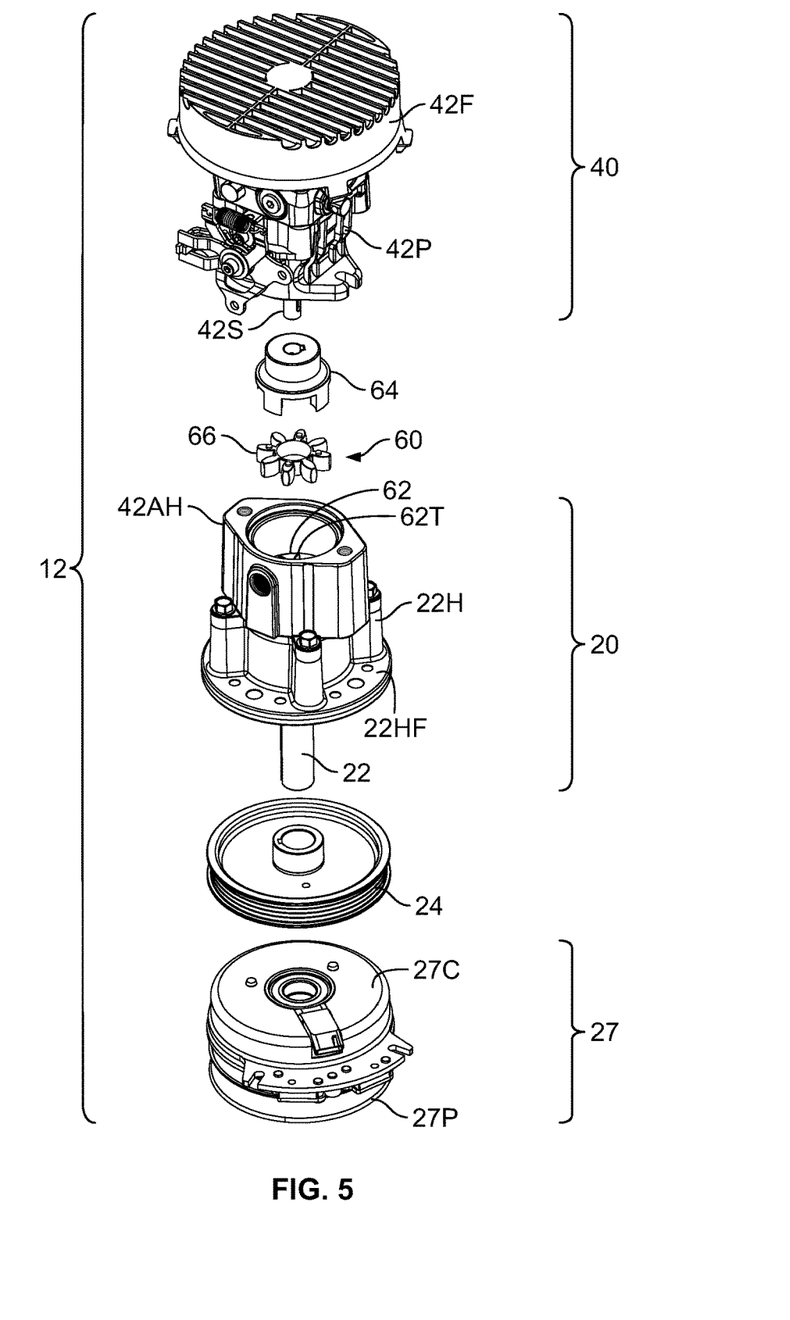
FIG. 5 is an exploded perspective view of one embodiment of the jackshaft power column.
Figure 6:
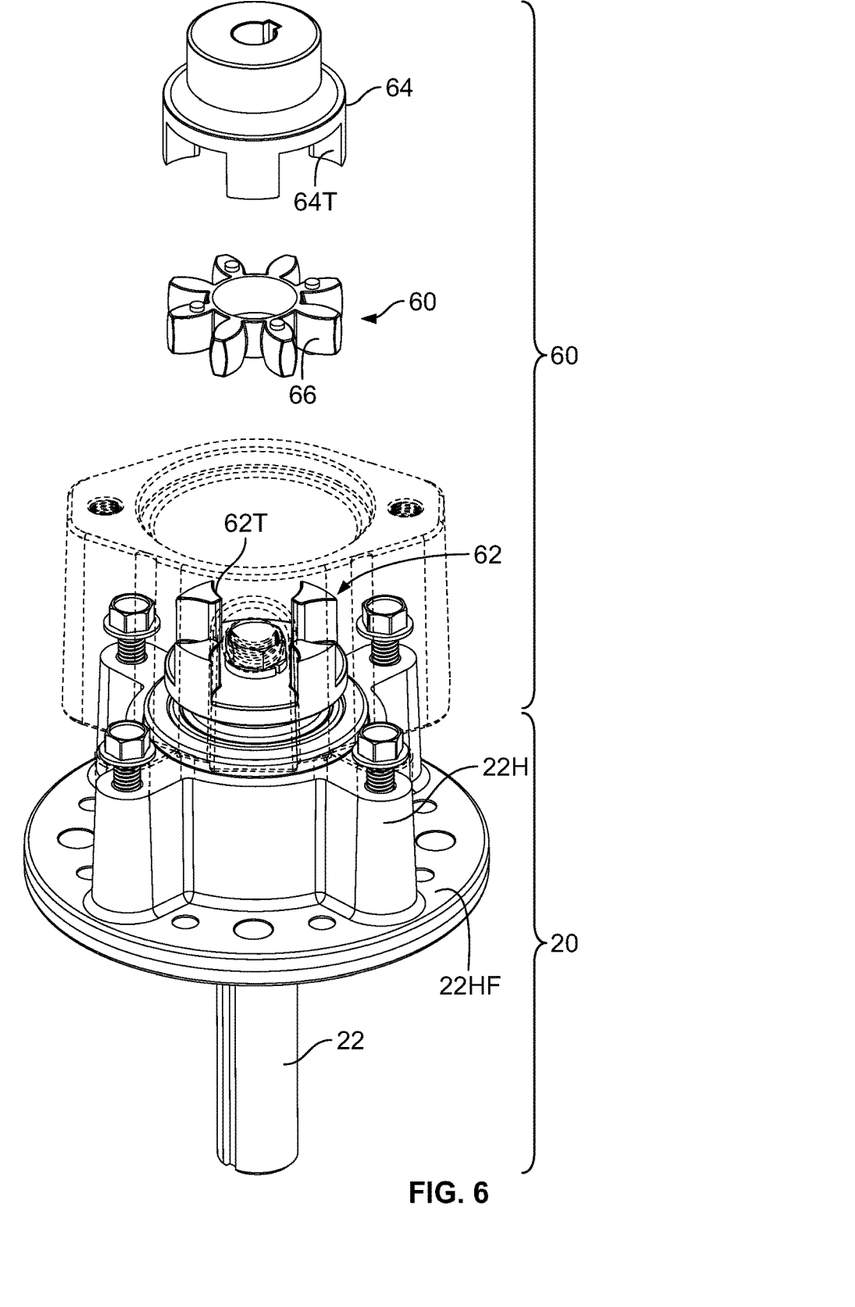
FIG. 6 is an enlarged exploded perspective view of a portion of one embodiment of the jackshaft assembly and flexible coupler assembly.

As can be seen in FIGS. 5 and 6, jackshaft power column 12 includes a jackshaft assembly 20, a jackshaft drive pulley 24, a deck drive pulley assembly 27, pump assembly 40 and a flexible coupler assembly 60. In this example, jackshaft power column 12 is generally upright and is located proximate to operator platform 6 as shown in FIG. 2. As can be seen in FIG. 5, Jackshaft assembly 20 includes a jackshaft bearing housing 22H and a jackshaft 22. Jackshaft bearing housing 22H presents a bearing housing flange 22HF which is suitable for mounting jackshaft bearing housing 22H to mower frame 3. As its name implies, jackshaft bearing housing 22H supports a bearing (not shown) which rotatably mounts jackshaft 22 to jackshaft bearing housing 22H and then, in-turn, to mower frame 3. As can be seen in FIGS. 4 and 5, jackshaft drive pulley 24 is mounted to jackshaft 22. Jackshaft drive pulley 24 is connected by a main drive belt 24B (shown in FIG. 3) to the main drive pulley 4D of engine 4. Thus, jackshaft drive pulley 24 and jackshaft 22 rotate with drive shaft 4S and main drive pulley 4D of engine 4. As can also be seen in FIGS. 4 and 5, in this example, a deck drive pulley assembly 27 is mounted to the lower end of jackshaft 22. In this example, deck drive pulley assembly 27 includes a clutch 27C and a deck drive pulley 27P. In this example, clutch 27C is an electric clutch which is interposed between jackshaft 22 and deck drive pulley 27P so that it is possible to selectively operate cutting deck 7.

As can be seen in FIGS. 4 and 5, in this example, a first hydraulic pump assembly 40 is mounted to the upper end of jackshaft power column 12. As can be best seen in FIGS. 4 and 5, pump assembly 40 includes a pump 42P, a pump fan 42F (which operates to maintain pump 42P within an acceptable temperature range) and a pump shaft 42S which is operable to drive pump 42P. As noted above, pump 42P supplies pressurized hydraulic fluid for driving the hydraulic motor (not shown) of first drive wheel 5A. As can be seen in FIGS. 4 and 5, in this example, pump 42P is mounted (bolted) to jackshaft bearing housing 22H by a pump adapter housing 42AH which is arranged to fit together with both pump 42P and bearing housing flange 22H.

As can be best understood by referring to FIG. 6, flexible coupler assembly 60 connects jackshaft 22 and pump shaft 42S of pump assembly 40. In this example, flexible coupler assembly 60 includes a lower hub 62, an upper hub 64 and an elastomeric insert 66. In this example, lower hub 62 is fixed to jackshaft 22. Lower hub 62 presents a pattern of radially spaced lower hub teeth 62T which project normally from the base of the hub. In FIG. 6, lower hub 62 appears to be bolted to jackshaft 22 but may also be integral with jackshaft 22. Upper hub 64, which in this example is keyed to pump shaft 42S, also presents corresponding radially spaced upper hub teeth 64T which project down from the upper portion of hub 64. If lower hub 62 and upper hub 64 are brought together so that their teeth 62T and 64T are radially staggered, then radial gaps are defined between teeth 62T and 64T. Elastomeric insert 66 presents spaced radial teeth which are arranged to fit into the gaps which are defined between teeth 62T and 64T of lower and upper hubs 62 and 64 respectively when hubs 62 and 64 are brought together. Because the material of flexible elastomeric element 66 is flexible and resilient, it is possible for jackshaft assembly 20 to accommodate some mismatch or misalignment between lower hub 62 and upper hub 64 and for there to be some mismatch between the surfaces of teeth 62T and 64T of lower hub 62 and upper hub 64 respectively.

As noted above cutting deck 7 is located forward of operator stand-on platform 6 and may comprise a typical three blade cutting deck. Cutting deck 7, in this example is mounted to mower frame 3 so that its elevation may be adjusted between a minimum cutting height and a maximum cutting height. In FIG. 1, cutting deck 7 has been exploded away from frame 3. The unexploded position of cutting deck 7 can be reconstructed by the skilled reader by aligning lines A at indicated points A1 and lines B and C at indicates points B1 and C1 respectively. Blade drive pulleys 7A, 7B and 7C are rotatably mounted to the upper wall of cutting deck 7 as shown in FIG. 1 and are connected to cutting blades (not shown) which are mounted within cutting deck 7. Also rotatably mounted to the upper wall of cutting deck 7 is an idler pulley 8A which is interposed between blade drive pulleys 7A and 7B. Idler pulley 8A improves the belt wrap angles around blade drive pulleys 7A and 7B. As can be seen in FIG. 1, deck drive belt 27B connects between cutting deck drive pulley 27P of jackshaft assembly 20 and the pulleys of cutting deck 7. As is indicated in FIG. 1, it is possible to define a jackshaft belt transfer zone BT1 and a cutting deck belt transfer zone BT2. Jackshaft belt transfer zone BT1 is generally where deck drive belt 27B is received and released by cutting deck drive pulley 27P of jackshaft power column 12. In this one embodiment, cutting deck belt transfer zone BT2 is generally where deck drive belt 27B is released by cutting blade drive pulley 7C and received by idler pulley 8B. Because cutting deck drive pulley 27P rotates in a clockwise direction when viewed from above, cutting deck drive belt 27B has a tension side 27BT and a slack side 27BL. Accordingly, idler pulley 8B is a spring biased tensioner idler pulley which maintains necessary tension in the slack side 27BL of deck drive belt 27B. The skilled reader may note that idler pulley 8B receives the back side of deck drive belt 27B so that a belt misalignment at idler pulley 8B may be more problematic than a belt misalignment at blade drive pulley 7C. The separation between pulleys 8B and 7C of cutting deck 7 and cutting deck drive pulley 27P of jackshaft assembly 20 may be understood as the separation between a jackshaft belt transfer zone BT1 and a cutting deck belt transfer zone BT2. In this example, the degree of separation shown in FIG. 2 is made possible by placing jackshaft assembly 20 at a location which is significantly farther from pulleys 8B and 7C than drive shaft 4S of engine 4 is from pulleys 8B and 7C. In this example, pulleys 8B and 8C are generally on the right side of centerline CL and somewhat forward of operator platform 6 while jackshaft assembly 20 is located on the left side of centerline CL and somewhat proximate to operator platform 6. If pulleys 8B and 7C were receiving a deck drive belt directly from a pulley mounted on engine drive shaft 4S, the distance between a resulting engine belt transfer zone and cutting deck belt transfer zone BT2 would likely be too small to accommodate sufficient deck height adjustment. Preferably, the resulting spacing between cutting deck 7 and jackshaft assembly 20 and more particularly between jackshaft belt transfer zone BT1 and cutting deck belt transfer zone BT2 is such that the angle of drive belt 27B does not vary more than approximately 5° when the cutting height of cutting deck 7 is adjusted between its minimum cutting height and its maximum cutting height.

As noted above first hydraulic pump 42P supplies pressurized hydraulic fluid to a first hydraulic motor (not shown) which powers first drive wheel 5A. As can be best seen in FIG. 3, main drive belt 24B also wraps around an idler pulley 25 and a hydraulic pump drive pulley 35 as well as a tensioner pulley 36 which is biased to maintain appropriate tension on main drive belt 24B. Hydraulic pump drive pulley 35 is mounted to a second hydraulic pump shaft 52S of a second hydraulic pump 52P. Second hydraulic pump 52P supplies pressurized hydraulic fluid to a second hydraulic motor (not shown) for powering the second drive wheel 5B.

As noted above, the resulting power distribution arrangement 10 which includes a jackshaft power column 12 provides an important advantage. Because the jackshaft of the jackshaft power column and the cutting deck drive pulley it carries is generally more distant from the zone where the cutting deck drive belt makes contact with the cutting deck than would be a drive pulley mounted to the engine drive shaft, it is possible to have a cutting deck which is able to move up and down for height adjustment independently of the engine and other power system components.

It is to be understood that while certain forms of this invention have been illustrated and described, it is not limited thereto, except in so far as such limitations are included in the following claims and allowable equivalents thereof.

What is claimed is:

1. A mower, comprising:
a mower frame supported by first and second drive wheels and at least one non-drive wheel,
an engine mounted to the frame which presents a drive shaft which carries a main drive pulley,
a height adjustable cutting deck having at least one cutting blade which is driven by at least one blade drive pulley,
a jackshaft assembly which includes a rotatable jackshaft,
a jackshaft drive pulley which is carried by the jackshaft and which is operably connected by a main drive belt to the main drive pulley of the engine for transferring power from the engine to the jackshaft,
a first hydraulic pump mounted coaxially with the jackshaft for supplying pressurized hydraulic fluid to a first hydraulic motor for powering the first drive wheel,
a cutting deck drive pulley which is carried by the jackshaft,
a cutting deck drive belt communicating between the cutting deck drive pulley of the jackshaft and the at least one blade drive pulley of the cutting deck, the cutting deck drive belt being received and released by the cutting deck drive pulley of the jackshaft at a jackshaft belt transfer zone and the cutting deck drive belt also being released by the at least one blade drive pulley of the cutting deck at a cutting deck belt transfer zone, the distance between the jackshaft belt transfer zone and the cutting deck belt transfer zone being greater than the distance between drive shaft of the engine and the cutting deck belt transfer zone.

2. The mower of claim 1, wherein:
the jackshaft is upright.

3. The mower of claim 1, wherein:
the main drive pulley rotates on an upright axis and the jackshaft is upright.

4. The mower of claim 1, wherein:
the main drive belt is also operably connected to a second hydraulic pump for supplying pressurized hydraulic fluid to a second hydraulic motor for powering the second drive wheel.

5. The mower of claim 1, wherein
the main drive pulley, the jackshaft and the second hydraulic pump drive pulley all rotate on upright axes.

6. The stand-on mower of claim 1, wherein
the cutting deck drive pulley is connected through a clutch to the jackshaft so that power may be selectively transferred from the jackshaft to the cutting deck.

7. The mower of claim 1, wherein:
a flexible coupler is interposed between the jackshaft and the first hydraulic pump.

8. The mower of claim 7, wherein:
the flexible coupler includes two hubs with complimentary teeth extending from each hub and a plurality of gaps are defined between the complimentary teeth, and wherein an elastomeric element having radial teeth arranged to fill the plurality of gaps is interposed between the teeth.

9. A mower, comprising:
a mower frame supported by first and second drive wheels and at least one non-drive wheel;
an engine mounted to the frame, the engine including a drive shaft which carries a main drive pulley;
a jackshaft assembly including a rotatable jackshaft and being mounted to the frame, the jackshaft including a jackshaft drive pulley which is operably connected by a main drive belt to the main drive pulley of the engine, the jackshaft also carrying a cutting deck drive pulley,
a first hydraulic pump co-axially mounted at least indirectly to the jackshaft which supplies pressurized hydraulic fluid for powering a hydraulic motor that drives the first drive wheel,
a height adjustable cutting deck having at least one cutting blade which is mounted to the frame, the cutting deck including a blade-drive pulley system that includes a blade-drive pulley and an idler pulley disposed in close proximity to one another, and,
a cutting deck drive belt communicating between the cutting deck drive pulley of the jackshaft and the idler pulley and the blade drive pulley of the cutting deck, the jackshaft assembly and the cutting deck being arranged such that the distance between the jackshaft and the idler pulley and the blade drive pulley of the cutting deck is greater than the distance between drive shaft of the engine and the idler pulley and the blade drive pulley of the cutting deck.

10. The mower of claim 9, wherein:
the distance between the jackshaft and the idler pulley and the blade drive pulley of the cutting deck is at least seven times greater than the range of adjustment of the height of the cutting deck.

11. The mower of claim 9, wherein:
the transfer of power between the jackshaft and the cutting deck is controlled by a clutch.

12. The mower of claim 9, wherein:
a flexible coupler is interposed between the jackshaft and the first hydraulic pump.

13. The mower of claim 12, wherein:
the flexible coupler includes two hubs with complimentary teeth extending from each hub and a plurality of gaps are defined between the complimentary teeth, and wherein an elastomeric element having radial teeth arranged to fill the plurality of gaps is interposed between the teeth.

14. A mower, comprising:
a mower frame supported by first and second drive wheels and at least one non-drive wheel,
an engine mounted to the frame which presents a drive shaft which carries a main drive pulley,
a height adjustable cutting deck having at least one cutting blade which is driven by at least one blade drive pulley,
a jackshaft assembly which includes a rotatable jackshaft,
a jackshaft drive pulley which is carried by the jackshaft and which is operably connected by a main drive belt to the main drive pulley of the engine for transferring power from the engine to the jackshaft,
a hydraulic pump mounted coaxially with the jackshaft for supplying pressurized hydraulic fluid to a first hydraulic motor for powering the first drive wheel,
a cutting deck drive pulley which is carried by the jackshaft,
a cutting deck drive belt communicating between the cutting deck drive pulley of the jackshaft and the at least one blade drive pulley of the cutting deck.

15. The mower of claim 14, wherein,
the distance between the cutting deck drive pulley of the jackshaft and the at least one blade drive pulley of the cutting deck is greater than the distance between the main drive pulley of the engine and the at least one blade drive pulley of the cutting deck.

16. The mower of claim 15, wherein:
the main drive pulley rotates on an upright axis and the jackshaft is upright.

17. The mower of claim 15, wherein:
the main drive belt is also operably connected to a second hydraulic pump for supplying pressurized hydraulic fluid to a second hydraulic motor for powering the second drive wheel.

18. The mower of claim 14, wherein:
a flexible coupler is interposed between the jackshaft and the first hydraulic pump.

19. The mower of claim 15, wherein:
a flexible coupler is interposed between the jackshaft and the first hydraulic pump.

* * * * *